United States Patent

Perreault

[15] 3,659,207

[45] Apr. 25, 1972

[54] MULTI-WAVEFORM GENERATION FROM A SINGLE TAPPED DELAY LINE

[72] Inventor: Donald A. Perreault, Pittsford, N.Y.

[73] Assignee: Xerox Corporation, Rochester, N.Y.

[22] Filed: Oct. 8, 1969

[21] Appl. No.: 864,724

[52] U.S. Cl. ................................328/14, 307/229, 307/260, 328/56, 328/60, 328/103

[51] Int. Cl. ........................................................H03b 19/00

[58] Field of Search....................328/14, 55, 56, 60, 61, 103, 328/105, 156, 157, 37; 307/229; 333/18; 179/15, 15 BC

[56] References Cited

UNITED STATES PATENTS

| | | | |
|---|---|---|---|
| 3,024,417 | 3/1962 | Secretan | 328/56 X |
| 3,112,469 | 11/1963 | Milford | 340/146.3 |
| 3,209,263 | 9/1965 | Keiper, Jr. | 328/103 |
| 3,297,951 | 1/1967 | Blasbalg | 328/37 |
| 3,305,785 | 2/1967 | Carroll, Jr. | 328/56 |
| 3,325,721 | 6/1967 | Clark | 321/60 |
| 3,340,469 | 9/1967 | Catherall et al. | 328/156 |
| 3,358,128 | 12/1967 | Oliver | 328/56 |
| 3,474,260 | 10/1969 | Frohbach | 307/221 |
| 3,314,015 | 4/1967 | Simone | 328/14 X |
| 3,522,383 | 7/1970 | Chang | 179/15.55 |
| 3,524,023 | 8/1970 | Whang | 325/30 X |
| 3,531,720 | 9/1970 | Norsworthy | 328/37 X |

*Primary Examiner*—Stanley D. Miller, Jr.
*Attorney*—James J. Ralabate, John E. Beck and Franklyn C. Weiss

[57] ABSTRACT

In a data communication system a multi-waveform generator for simultaneously generating a number of independent wave trains composed of different waveforms. By the use of a single tapped delay line and appropriate gating, gain adjustment and summing circuitry for each channel, independent output waveforms or a multi-state signal can be generated even though the input data streams are independent.

17 Claims, 14 Drawing Figures

INVENTOR.
DONALD A. PERREAULT
BY Franklyn C. Weiss
ATTORNEY

| INPUT DIBIT | "A" GATES | "B" GATES | "A" OUTPUT | "B" OUTPUT | "A"+"B" OUTPUT |
|---|---|---|---|---|---|
| | X Y | X Y | | | |
| 0 0 | 0 0 | 1 0 | 0 | −3 | −3 |
| 0 1 | 0 0 | 0 1 | 0 | −1 | −1 |
| 1 0 | 0 1 | 0 0 | +3 | 0 | +3 |
| 1 1 | 1 0 | 0 0 | +1 | 0 | +1 |

LOGIC TABLE

MULTI-WAVEFORM GENERATION FROM A SINGLE TAPPED DELAY LINE

BACKGROUND OF THE INVENTION

In the field of data communication and transmission it is important to accurately convert the data information to a form that can be transmitted over a transmission medium to a remote location by as economical but accurate method as possible. Prior art modulation techniques include amplitude modulation, frequency modulation, and phase modulation, wherein the data input is converted to these forms prior to transmission. As data rates increase over limited bandwidth transmission media, however, sophisticated versions of the known modulation techniques must be utilized in order to overcome increasing distortion and a low signal to noise ratio due to the increased data rate.

One prior art technique of signal generation in a data transmission system is by the use of a tapped delay line and associated circuitry wherein incoming binary data, for example, in the form of "mark" or "space" information, i.e., binary digits of "one" or "zero", are applied to the delay line and by means of selective predetermined adjustment of the gain controls on the delay line output taps, a predetermined signal waveshape can be generated. This waveform can be transmitted by itself as a base band signal or can be converted by any prior art modulation technique to a different pass band frequency. In a multi-level situation wherein two-level binary information is transmitted by more than two data levels in the output circuitry, prior art teachings have necessitated the use of a separate delay line for each of the output data levels. Such a technique has inherent disadvantages of the need for the plurality of delay lines themselves and in addition different delay lines have different operating characteristics and the associated circuitry coupled to these delay lines must be accurately adjusted in order to derive proper output signals.

OBJECTS

It is, accordingly, an object of the present invention to provide for improved data signal generation in a data communication system.

It is another object of the present invention to provide an improved modulator for digital data in the generation of multistate signals.

It is another object of the present invention to provide an improved multi-waveform generator by the use of a single tapped delay line.

It is another object of the present invention to provide for the simultaneous generation of a number of independent wave trains composed of different waveforms by means of a single tapped delay line.

BRIEF SUMMARY OF THE INVENTION

In accomplishing the above and other desired aspects of the present invention, Applicant has invented improved methods and apparatus for the generation of multi-waveform signals by the use of a single tapped delay line. In a first embodiment, signals occurring regularly at the transmission rate would be sequentially propagated down the stages of a multi-stage delay line. Coupled to the delay line and comprising a first channel would be gate circuitry, gain adjustments, a shift register and an output summer circuit. The input data to be modulated by this channel would be coupled to the gating circuitry which are sequentially enabled by the propagation of said transmission rate pulses down the stages of the delay line. Sequential operation of the shift register upon energization by a clock, whose frequency is the transmission rate, allows continuous predetermined groups of output gating circuits coupled to the delay line to be enabled or not enabled thereby, according to the pattern of the input data. Coupled to all the gating circuits are the gain adjustment circuits which have been preset to predetermined values to amplify positively or negatively the output signals received from the gating circuits. Depending upon the specific setting of each gain adjustment circuit, an output signal from the summer coupled to the output of all the gain adjustment circuits can be generated of any predetermined frequency and amplitude, provided that sufficient number of delay stages are present in the circuit.

Instead of providing a separate delay line for a second channel, a second set of gating, shift register, and gain adjustment circuits connected to a second output summer would be coupled to the tapped delay line. Thus, as the transmission rate pulse is propagated down the delay line, a second series of input data signals could be applied to the second channel and thus the output gain adjustment circuits, which again have been adjusted in a predetermined manner, can generate a second output waveform, the phase, amplitude, and frequency of which can be the same as or completely different from the signal generated in the other channel and which can be coincident in time or separated by multiples of the signalling interval, according to the occurrences of the two separate data streams. As many channels as are desired can be coupled in parallel to the tapped delay line to provide any number of independent waveforms for separate channels or a composite signal for application over one channel.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

Figure 1:
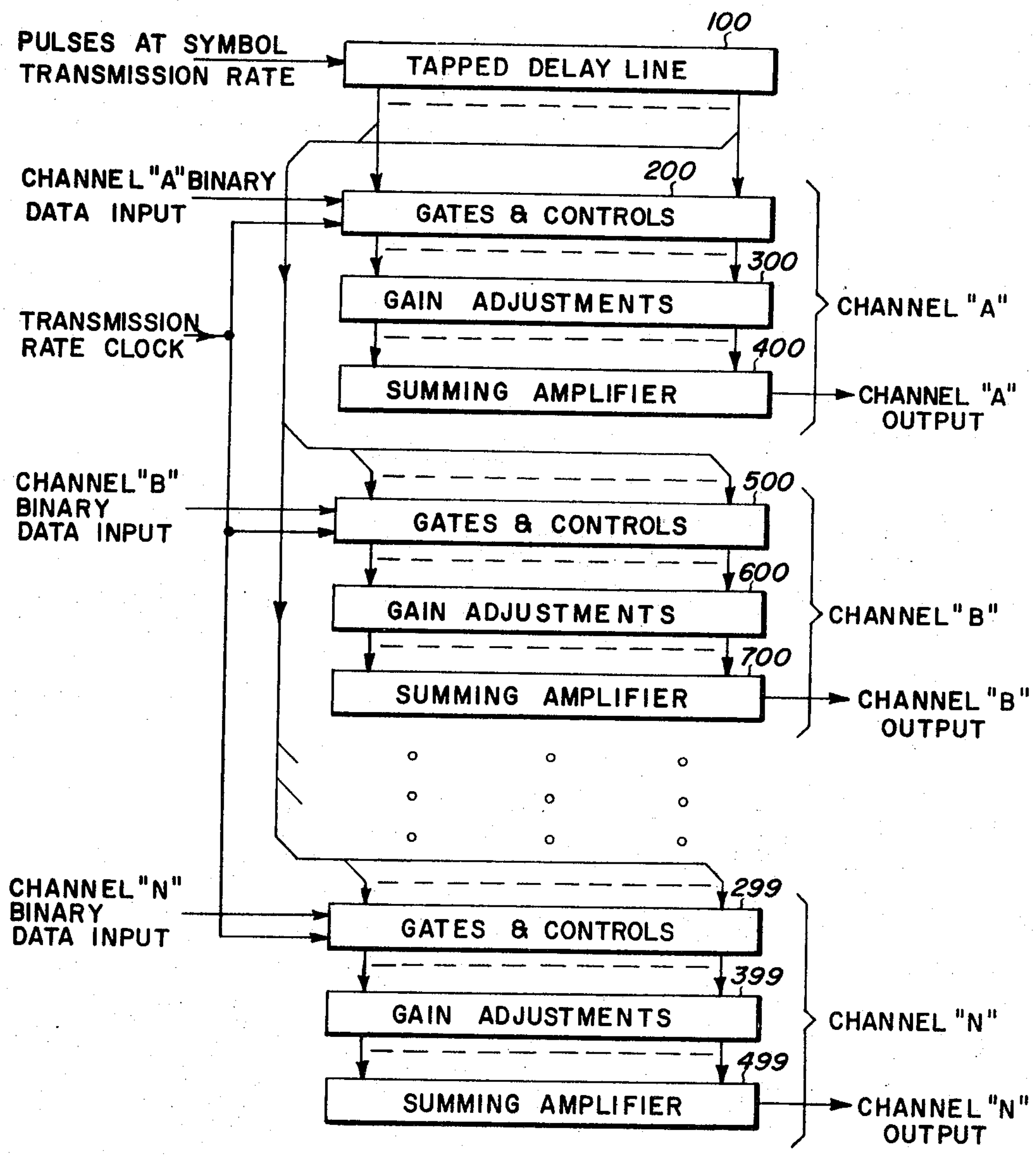
FIG. 1 is a block diagram of the multi-waveform generation circuit in accordance with the principles of the present invention.

FIG. 1 of the present application shows by a block diagram how the multi-waveform signals for all the channels can be created from a single tapped delay line even though the input data streams are independent. A single tapped delay line 100, of conventional design, is pulsed continuously at the symbol transmission rate of the system in which it is used. The output taps of the delay line are applied in parallel to multiple sets of gain adjustments via multiple sets of control gates. That is, gates and controls 200 would be coupled to the tapped delay line 100 and a source of channel A binary data for the generation of the waveform for propagation in channel A. Coupled to the gates and controls 200 are the gain adjustments 300 which output to the summing amplifier 400 to form the actual output in channel A.

A different waveform to be generated in channel B would be provided by channel B input binary data applied to gates and controls 500 which are coupled in parallel to those leads coupled to gates and controls 200 of channel A from the tapped delay line 100. Coupled to the gates and controls 500 are the necessary gain adjustments 600 for generation of the waveform during the particular times inherent in the operation of the tapped delay line, to be more fully hereinafter described. Coupled to the gain adjustments 600 is the summing amplifier 700 which outputs as channel B.

Any number of channels can be coupled to the single tapped delay line 100 as shown by the gates and controls 299, gain adjustments 399, and summing amplifier 499, which outputs as a channel N in response to the channel N binary data input. Common to all the channels would be a transmission rate clock for external control of the separate channels.

The independent data streams for channel A, channel B, to channel N control the different sets of gates within the apparatus for each channel, creating or not creating a waveform from each pulse which is propagated down the tapped delay line 100. The data streams must be synchronous with the transmission rate pulses coupled to the tapped delay line 100. If the delay line is longer than the time between pulses, the output waveforms from the separate channels from adjacent pulses will overlap in time. In the same channel a composite signal would result; but, in different channels, the outputs would still be independent. The outputs thereof may be baseband signals or passband signals or both. They may be in the same or in different frequency bands depending upon the adjustments made in the gain adjustments 300, 600, etc. However, the delay line 100 must have the proper delay per stage and the proper number of stages to produce any of the desired outputs.

Figure 2:
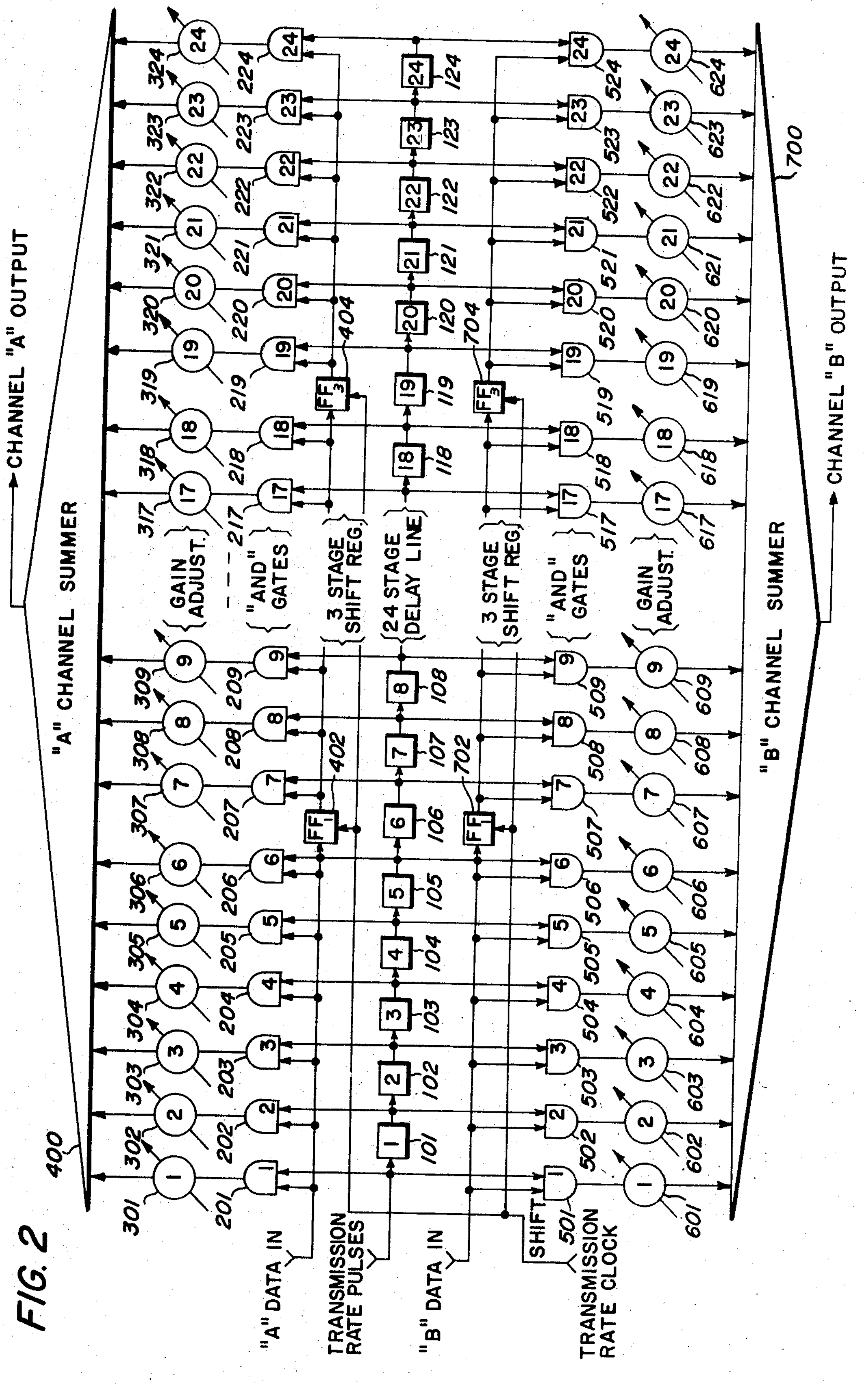
FIG. 2 is a detailed diagram of the multi-waveform generator in accordance with a first embodiment.
Figure 3:
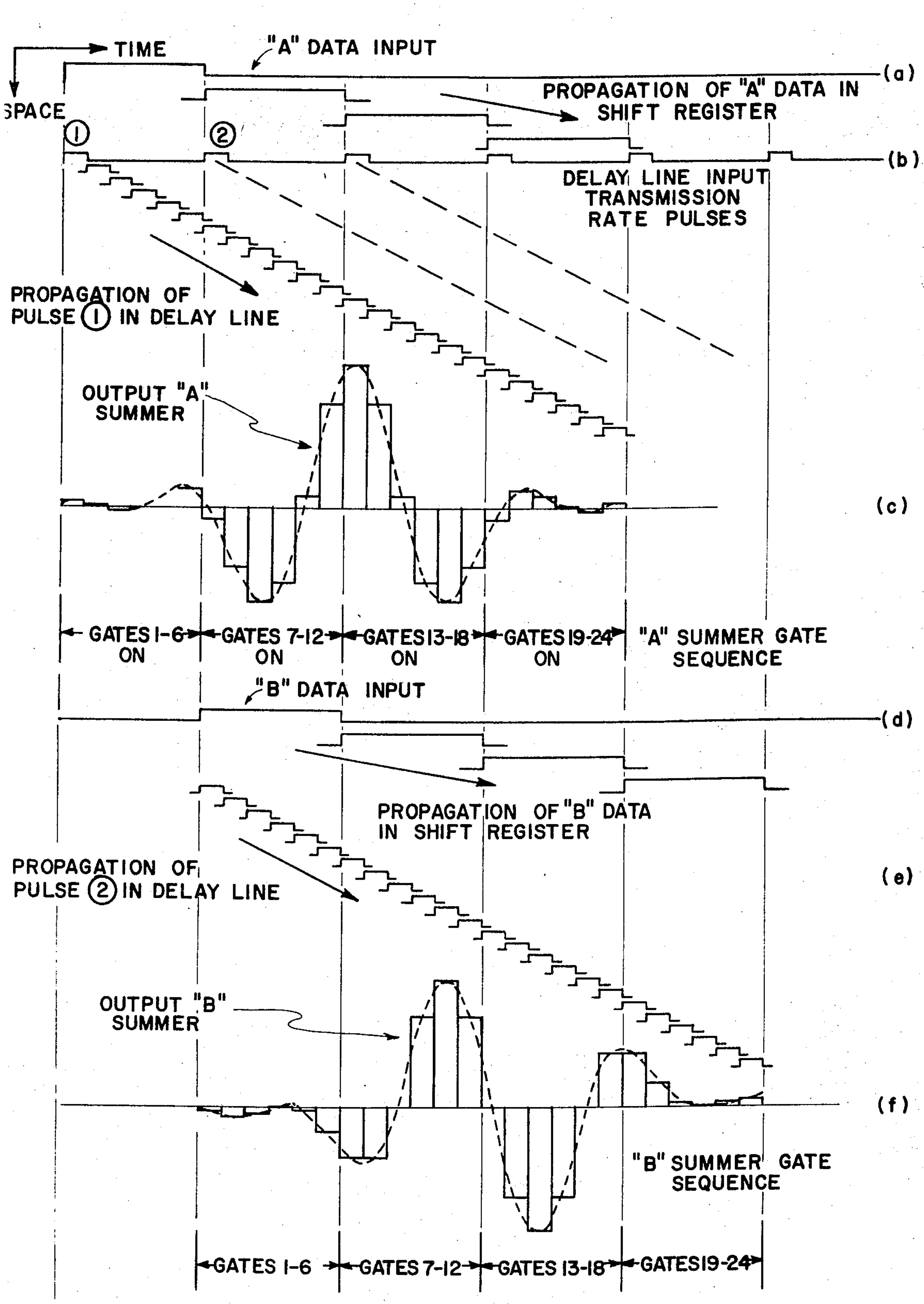
FIGS. 3(a) to 3(f) are curves helpful in understanding the operation of the diagram in FIG. 2.

FIG. 2 shows the actual construction of the delay line and other circuitry for channels A and B. Only the two channels are illustrated, it being understood that more could be added in parallel as indicated in FIG. 1. The data in each channel is binary. That is, when a "one" occurs, the circuit produces an output waveform. When a "zero" occurs, no output is produced. The waveforms corresponding to an isolated "one" in each channel are shown in FIG. 3. The "one's" in channel A (FIG. *3a*) and channel B (FIG. *3d*) are staggered by one transmission interval. They could as well be coincident and still produce different output waveforms.

The delay line 100 in FIG. 2 is, for this example, four transmission intervals long with the delay of each stage equal to one-sixth of the transmission interval, a total number of 24 stages. The input pulses to the delay line 100 are one-sixth of the transmission interval in duration. The tap gain controls 300 and 600 are adjusted to produce bandpass signals in the same frequency band but differing in phase. The data is applied to the control gates 200 and 500 via shift register 402, 404, and 702, 704, such that each data bit exists for four transmission intervals as it propagates through the shift register.

The pulses applied to the 24-stage delay line 100, FIG. *3b*, are coincident with the leading edge of the data signal, FIG. *3a*, at the input. That is, the rise time of the signals in FIGS. *3a* and *3b* as applied to channel A are coincident. The pulse coincident with the "one" or "mark" in channel A is designated as pulse number 1 in FIG. *3b*. Thus, pulse number 1 in FIG. *3b* is applied to the input delay line 100 at stage 101. As pulse number 1 propagates down the delay line 100 through stages 101, 102, 103, 104, 105 and 106, it appears sequentially at taps one through six thereof during the transmission interval at predetermined sub-multiples thereof. This can be seen in FIGS. *3a* and *3b* wherein the time that the pulse in FIG. *3a* is "up" the pulse number 1 in FIG. 3b has propagated through six stages of delay line 100. The outputs of stages 101 through 106 of delay line 100 are also coupled to the inputs of AND-gates 201, 202, 203, 204, 205 and 206. Coincident with the pulses propagated down the delay line, the "up" signal is continuously present at gates 201 through 206. Thus, as pulse number 1 is propagated down the delay line, gates 201 through 206 will be enabled consecutively. Thus, gates 201 through 206 are "on" sequentially during this time due to the "one" in channel A, and thus the outputs from gates 201 through 206 are applied sequentially to gain controls 301, 302, 303, 304, 305, and 306.

At the end of a transmission interval, that is, at the time the signal in FIG. *3a* returns to zero, the "one" present on the A data in line is shifted into the first stage 402 of a three-stage shift register. This would occur by the enabling of flip-flop 402 by a transmission rate clock shown in FIG. 2. Gates 201 through 206 are now disabled, i.e., turned off, and gates 207, 208, 209, and those gates not shown as 210, 211 and 212 are turned on as the pulse number 1 is continuously propagated down delay line 100. In order to conserve space in FIG. 2, only apparatus up to stage eight of the delay line and from stage eighteen to twenty-four of the delay line are shown. Pulse number 1 now appears sequentially at taps seven to twelve of delay line stages 107, 108, 109, and if shown, 110, 111 and 112 and gated into the associated gain controls through gates 207, 208, 209, and if shown, 210, 211 and 212 to the gain adjustments 307, 308, 309, and if shown, 310, 311, and 312. At the end of the second transmission interval, the data "one" signal in FIG. *3a* is shifted to the next stage of the shift register, not shown, but which would be placed after the twelfth stage of delay line 100 as was for the first stage 402.

As in the case for gates 201 through 206, when the second shift register stage, not shown, is energized by means of the "one" signal on the "A" data in line and the signal from the transmission rate clock in FIG. 2, gates 207 to 209, and if shown, 210 to 212, are disabled and go off. Gates 213, 214, 215, 216, if shown, and gates 217 and 218 are enabled, and so on. As a result of these actions, with the data "one" signal in FIG. *3a* being propagated through the three stages of the shift register and the pulse number 1 signal being propagated through all the stages of delay line 100, the channel A summer 400 inputs consist of sequential amplitude adjusted versions of pulse number 1. That is, as pulse number 1 in FIG. *3b* is propagated down the delay line 100, the outputs therefrom are sequentially gated through gates 201 to 224 by means of the stepping through the three-stage shift register of the signal pulse on the "A" data input line.

The signal outputs from gates 201 through gates 224 are the same waveshape as pulse number 1 gated therethrough. However, gain adjustments 301 through 324 amplify either positively or negatively the signal outputs from gates 201 to 224. Thus, the channel A summer 400 sums the inputs thereto at particular times and produces the signal in FIG. *3c* at the channel A output. That is, each of the gain adjustments 301 to 324 would amplify positively or negatively those number 1 pulses in FIG. *3b* as propagated down the line 100. In the example shown in FIG. *3a*, if a single "one" pulse is propagated through the shift register 402, 404, with no other "one" pulses appearing in the shift register until the "one" signal is propagated through the shift registers, the output of channel A summer 400 will be the rectangular-shaped signals seen in FIG. *3c*. A filter, not shown, either at the input, if gates 200 are linear, to the delay line 100 or at the output of the channel A summer 400, will produce the dotted-line signal, which is the band limited version thereof, on the output line as a result of the rectangular-shaped signals thereon. It can be seen, therefore, by utilizing the stages of the delay line 100, in conjunction with the gates and gain adjustments and the summer, that a particular waveshape can be generated in accordance with a data signal on the channel A input. It is noted that the output of the channel A summer 400 is produced only by pulse number 1 in FIG. *3b*, even though other pulses may be also propagating down the delay line at the same time.

Applicant's invention, however, relates to the fact that by the use of one delay line 100, any number of signal waveforms can be generated by parallel operation and selective gain adjustment of similar circuitry coupled to the delay line 100. That is, pulse number 2 in FIG. 3b would be coupled to the input stage 101 of delay line 100 one transmission interval later, for example, from the signal applied to the channel A input at FIG. *3a*. Channel B is shown operating one transmission interval later than channel A. However, it could just as well be coincident, i.e., channel B could produce an output from pulse number 1. In a manner exactly like channel A, the pulse number 2 in FIG. *3b* would be propagated down the delay line through stages 101 through 124. The "one" signal in FIG. *3d* appearing at the inputs of gates 501, 502, 503, 504, 505 and 506 enables same in conjunction with the stepping through the delay line of the number 2 pulse. The outputs of gates 501 through 506 are applied to gain adjustments 601, 602, 603, 604, 605 and 606. Depending upon the predetermined adjustments of gain adjustments 601 through 606, the output thereof can be amplified positively or negatively and applied to the input of channel B summer 700. In a manner similar to that of channel A, the "one" signal input to channel B in FIG. 3*d* is stepped through the shift register 702, 704, as hereinabove described. Thus, gates 501 through 524 are enabled as the "one" pulse in FIG. 3d is stepped through the shift register 702, 704 and the pulse number 2 is propagated through delay line 100. Again, gates 501 through 524 would be selectively and sequentially enabled with gain adjustments 601 through 624 amplifying positively or negatively the signals applied thereto upon energization of shift register 702, 704. Thus, the channel B output in FIG. 2 would be the signal appearing at FIG. 3*f* if the gain adjustments 601 through 624 were adjusted accordingly. Again, the output of channel B summer is a rectangular-shaped wave but appropriate filtering would cause the dotted-line signal to be generated.

In this example, therefore, pulse number 2 is gated by the data "one" in channel B and produces the waveform in FIG. 3*f* in the same manner as the data "one" in channel A produced the waveform seen in FIG. 3*c* due to different tap gain settings 300 and 600. It is noted that the output waveforms in FIG. 3*c* and FIG. 3*f* overlap in time but are independent as appearing on different channels. The channel A output is due only to pulse number 1 and the channel B output is due only to pulse number 2 and to associated circuitry. The outputs from channel A and channel B could both be produced by the same pulse if the data were coincident in the two channels. Furthermore, more than one pulse at a time can be producing output for a channel if the data "one's" are close enough to exist in the shift register simultaneously. That is, if a "one" appears within any other "one" appearing within the shift registers in FIG. 2, then simultaneous generation of output signals as the signals pulses number one, two, etc., are propagated down the delay line will be generated and a composite waveform of the amplitudes in accordance with gain adjustments 300 and 600 will be generated in accordance with FIGS. 3*c* and 3*f*, as is common in band limited data transmission systems.

The essence of Applicant's invention, therefore, is that the data for the different channels is propagated independently in separate shift registers so that independent control of a common continuous pulse train and its delayed replicas can be achieved. In effect, the pulse outputs of the tapped delay line 100 are "modulated" by the data inputs to the specific channels whereas in a single (or coincident) delay line waveform generator the pulse input is modulated by the data. The principal advantage of this technique over using separate delay line waveform generators rather than the single delay line shown here for each data stream is that the data shift registers are much shorter than the delay line in number of stages, typically four to six times shorter in addition to the obvious need for only a single tapped delay line.

Figure 4:
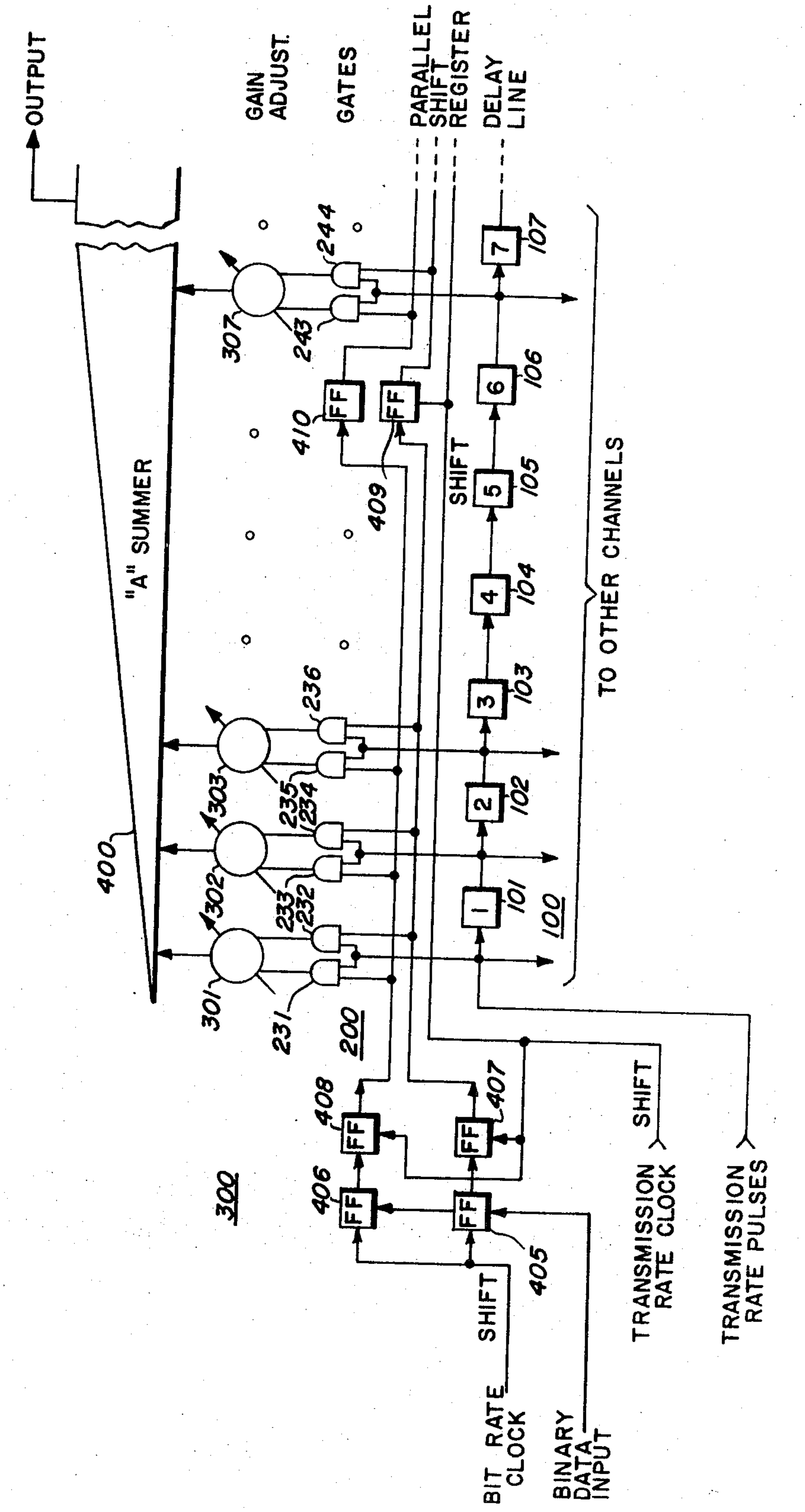
FIG. 4 is a diagram of an embodiment of the present invention showing unipolar multi-level waveform generation.

Referring now to FIG. 4, some systems require that the same waveform be produced with different amplitudes under control of the input data. When the amplitudes are all positive (and zero) or all negative (and zero) they can be produced by the circuitry shown in FIG. 4. Generation of zero and three other levels is illustrated therein. The incoming binary data is converted to dibits, i.e. pairs of bits, by means of the two stage shift register, comprising flip-flops 405 and 406. The binary digits are stepped through the shift register by means of the bit rate clock operating as a shift control. After every second bit rate clock pulse a transmission rate clock pulse applied to the inputs of flip-flops 407 and 408 allows the information in flip-flop 405 and 406 to be shifted out to the control gates 200. In a manner similar to that of FIG. 2, the transmission rate pulse is propagated down the delay line 100 through stages 101 through 107. The remaining stages are not shown but would be similar to those already present in FIG. 4.

The dibits occurring in flip-flops 405 and 406 are propagated in parallel to flip-flops 407 and 408 at the dibit transmission rate by the clock as described above and sequentially control the gates 200 as in the above case for FIG. 2. That is, depending upon the signal level appearing at the output of flip-flops 407 and 408, the inputs to AND-gates 231 and 232, for example, would have any one of four possible combinations of dibits. Dibits, or pairs of bits, can appear in the combination of 01, 10, 00 and 11. Thus, depending on how AND-gates 231 and 232 are energized in conjunction with the transmission rate pulse appearing at the input to delay stage 101, gain adjust 301 will have any one of four inputs. The gain control 301 would include, for example, a digital to analog conversion network so that the amplitude applied to the adjustable gain control 301 assumes one of four levels, including zero, and the resulting output is correspondingly quantized.

The output from gain adjust 301 is a waveform whose relative amplitude is set by the gain adjustment and its absolute output set by the dibit code appearing at the inputs to AND-gates 231 and 232. The remaining stages of the delay line 100, gates 200, and gain adjust 300 would operate in a manner similar to that of the gates 231 and 232 with gain adjust 301 as the transmission rate pulse is propagated down delay line 100. The summer 400, in a manner similar to that of the summers in FIG. 2, would sum the signals applied thereto from the gain adjustments 300 and produce an output whose shape depends on the pattern of gain settings and whose amplitude is stepwise dependent on the dibit pattern applied thereto. Only channel A is shown for simplicity but it is understood that channel B and other channels may be coupled thereto in parallel. In such a system as set forth in FIG. 4, Gray coding can easily be introduced so that adjacent levels represent dibits which differ by only one bit. Up to four levels can be produced with two gates per tap, up to eight levels with three gates per tap, and so on according to the number of combination of binary sequences.

The binary on/off and multi-level unipolar generator as set forth above in FIGS. 1 and 4 are elementary modulators in themselves. More complex modulators can be constructed by appropriate arrangement of the input data streams and appropriate combinations of the outputs of a multi-wave generator.

Figures 5, 6A:
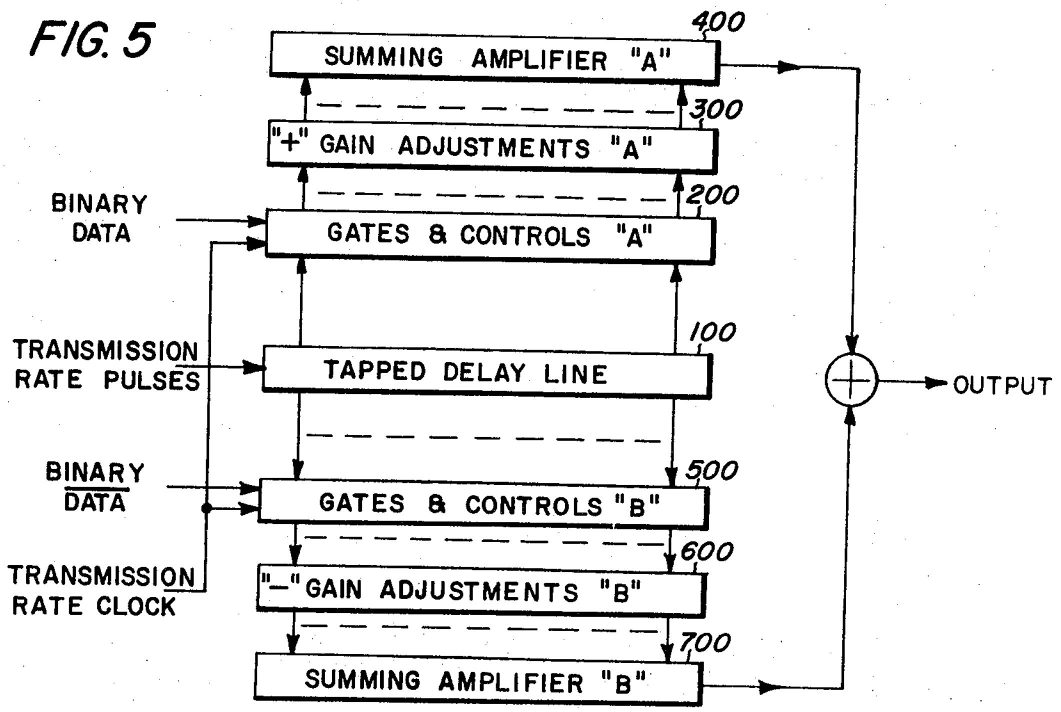
FIG. 5 is a diagram of an embodiment showing polar binary or two phase PSK generation.
FIG. 6*a* is a logic table and FIG. 6*b* is a diagram of an embodiment for multi-level polar waveform generation.

One such waveform generator for polar binary AM or two-phase phase-shift-keying, is seen in FIG. 5. A two-channel generator is adjusted so that the channel B output waveform is the amplitude inverse of channel A. Binary data is applied to channel A at gates and controls 200. The complement of the binary data is applied to channel B at gates and controls 500. With gain adjustments 600 adjusted for the inverse amplification of gain adjustments 300, the channel outputs would be added together to form a composite output waveform with constant average power, i.e., whenever one channel is off the other channel would be on. If the channels are adjusted for a baseband response, the output is a polar binary baseband signal. If, however, the channels are adjusted for a bandpass response, the output is a polar binary passband signal which is equivalent to two phase PSK. The arrangement shown above in FIG. 2 can be used as an FSK modulator if one channel is adjusted to produce a bandpass response centered at *f*1 and the other is adjusted to produce a bandpass response centered at *f*2, where *f*1 and *f*2 are selected according to the requirements of the FSK system.

Figure 6B:
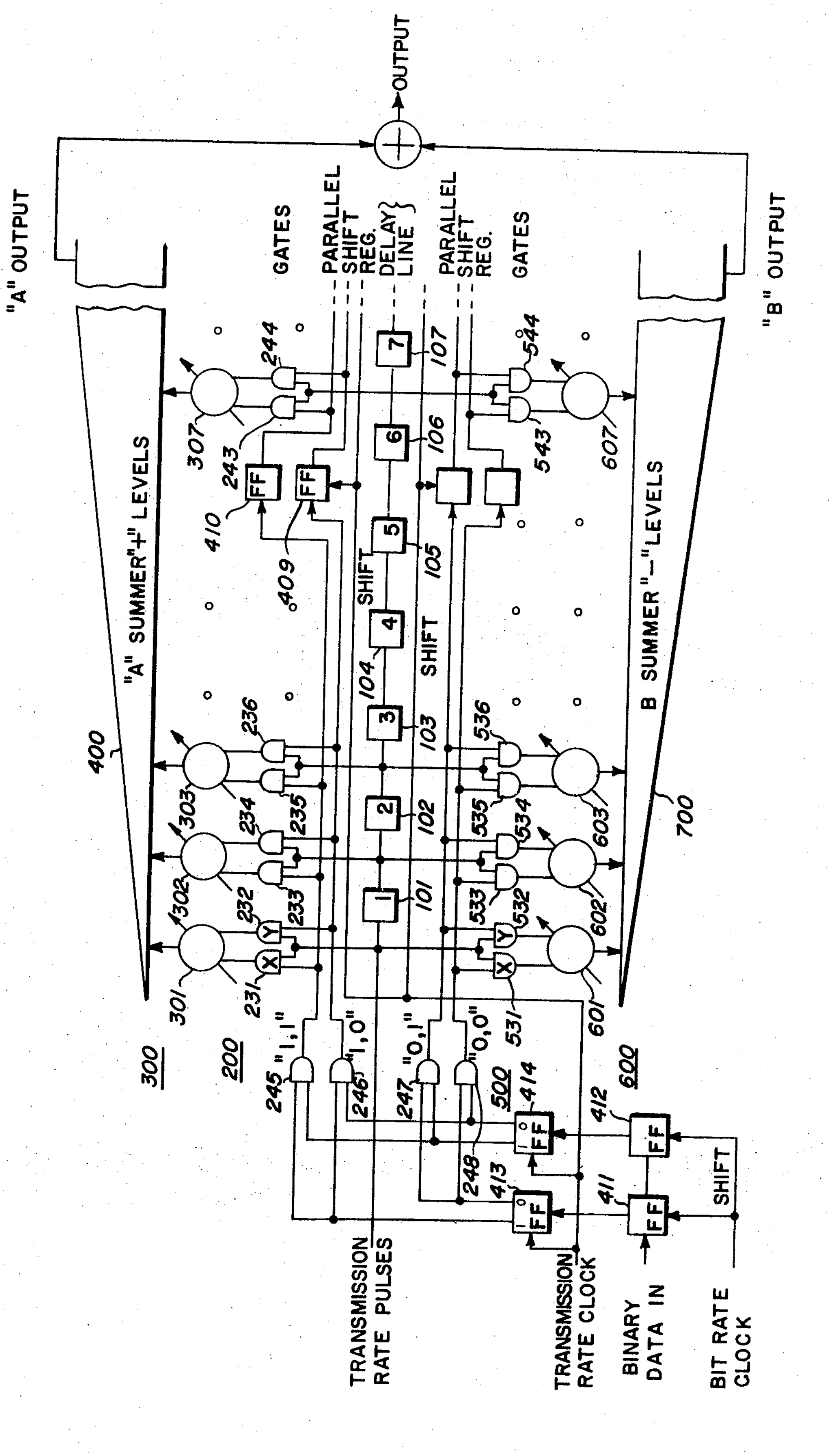

The circuitry in FIG. 6 shows an arrangement for a multi-level polar waveform generation system. A four-level case is illustrated, two positive levels and two negative levels designated +3, +1, −1, −3. The gating and gain adjustment arrangement are similar to that for the unipolar multi-level waveform system shown in FIG. 4. Here, however, in the polar case only three of the four gate combinations are used. That is, gating is arranged so that dibits with the most significant digit of "1" are propagated in parallel as the "A" channel data signal and dibits with the most significant digits as "0" and propagated in parallel as the "B" channel data signal. In FIG. 6 it can be seen that the binary data input is shifted serially into flip-flops 411 and 412 which are under control of the bit rate clock. The dibits are formed as the parallel output of flip-flops 411 and 412, which under control of the transmission rate clock, are shifted to flip-flops 413 and 414 in parallel. The dibits with the most significant digit of " 1" are detected by gates 245 and 246 for presentation to channel A circuitry. Those dibits with a most significant digit of "0" are presented to channel B through AND-gates 247 and 248. Thus, channel A will generate signals of +1 and +3 while channel B will generate signals of −1 and −3, with summers 400 and 700 giving the composite outputs signal of the multi-level polar signal.

FIG. 6a shows the logic table for use with FIG. 6 in determining the generation of the multi-levels with the specific input dibit information.

Figure 7:
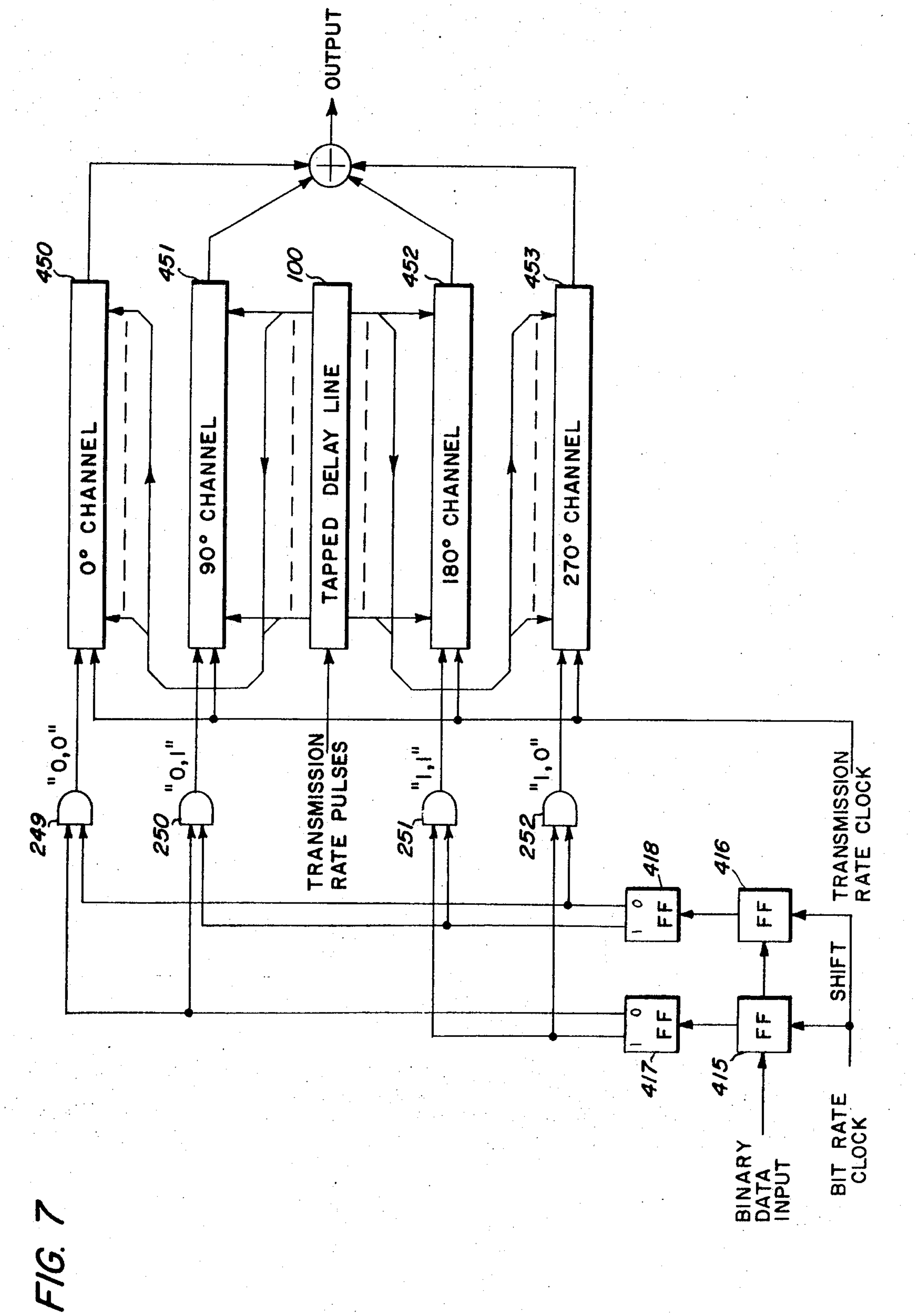
FIG. 7 is a diagram of an embodiment showing a four-phase PSK generator.

FIG. 7 illustrates a multi-phase phase-shift-keyed system utilizing the principles of the invention wherein only a single tapped delay line is utilized. FIG. 7 illustrates a four-phase case. The binary data input would be coupled to flip-flops 415 and 416 under control of the bit rate clock. Flip-flops 417 and 418 register, one at a time, the four combinations of binary dibits and present this information to the AND-gates 249, 250, 251 and 252, which detect the four combinations. The binary combination 00 detected by gate 249 is presented to the 0° channel 450. The 01 dibit combination detected by gate 250 is presented to the 90° channel 451. The 11 dibit combination detected by gate 251 is presented to the 180° channel 452 while the 10 dibit combination detected by gate 252 is presented to the 270° channel 453. Each of these channels would contain the binary on-off gates, controls, gain adjustments, and summer as shown above in one half of FIG. 2. The gating and gain adjustments are single level (on-off) as in one half of FIG. 2, except that four sets are used. The gain controls of each channel are adjusted to produce one phase of the desired four-phase output. As a result each dibit received in the system produces a different phase of the output signal. The outputs are combined into a composite signal of constant average power.

Figure 8:
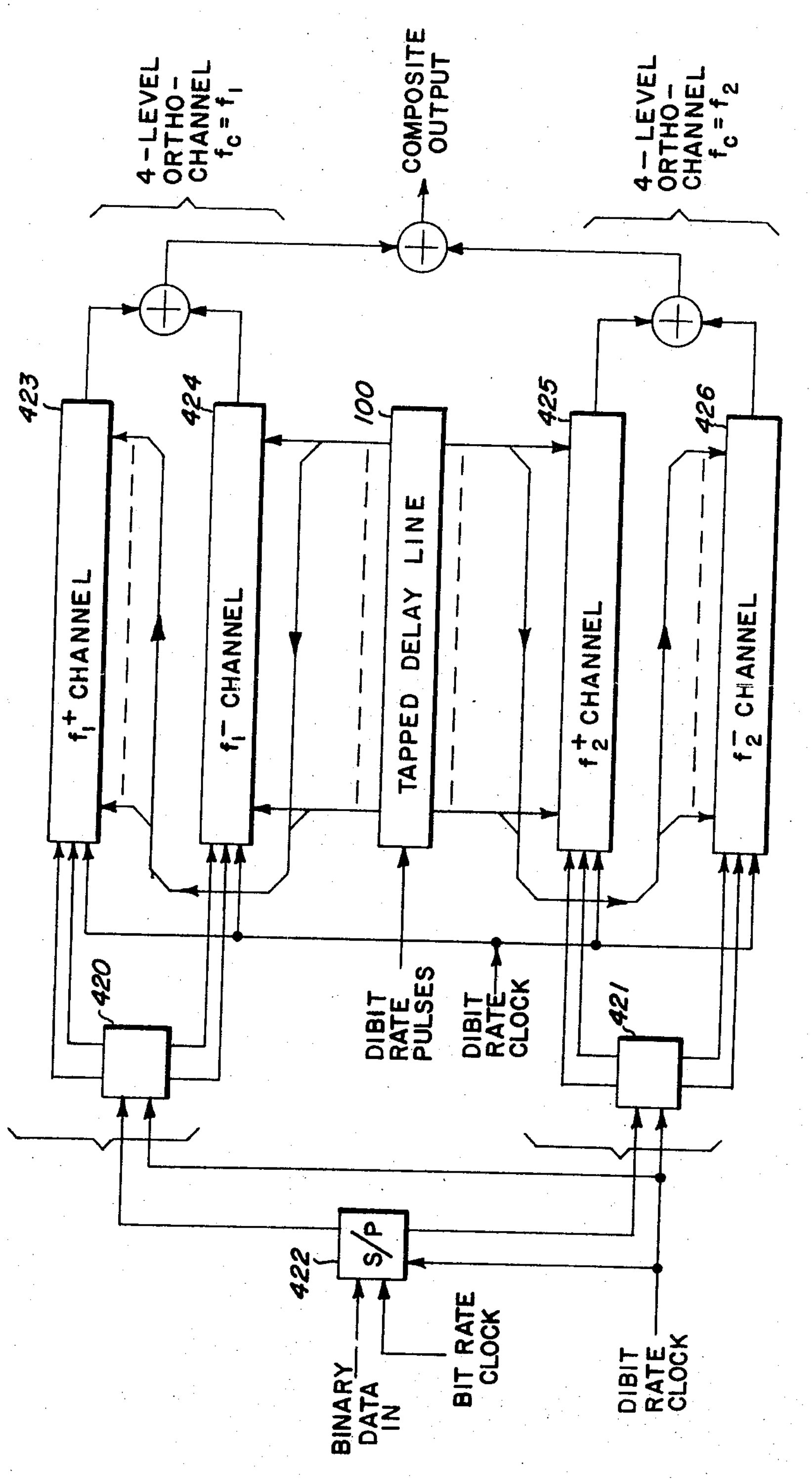
FIG. 8 is a diagram of an embodiment showing a four-level, two-channel ortho-system generator.

FIG. 8 shows a further extension of the present invention in a four-level, two-channel orthogonal system waveform generator. Each channel contains the polar multi-level gating and gain adjustment arrangement as shown in FIG. 6, but all are now connected to only one delay line 100. One pair of channels is adjusted for a bandpass four-level signal centered at *f*1. The other pair of channels is adjusted for a bandpass polar four-level signal centered at *f*2. The spacing of *f*1 and *f*2 and the phase relationships between the center frequencies are controlled by the tap gain settings in their respective channels, in accordance with the requirements of an ortho-channel system. Each ortho-channel 423, 424, 425, and 426 consists of the gates, controls, gain adjustments and summers as shown above in FIG. 6. A serial to parallel converter 422 at the input divides the input binary data into two parallel binary streams each running at half the input bit rate. The data streams are then handled individually as dibits as shown and described above in conjunction with FIG. 6. The transmission rate per ortho-channel is therefore one fourth of the input binary bit rate.

In some data transmission applications, a useful savings in the number of delay stages can be achieved by generating passband signals at low frequencies and then translating them to the desired transmission band. This technique can be used in any of the modulators described above. In the ortho-channel system, the composite output may be developed and then translated in one step to a higher frequency; or each channel may be developed in the same low frequency band, then translated to different higher frequency locations before combining to form the composite signal. The basic technique of this invention may also be used to generate multiple baseband signals from a single delay line, which signals may then be used to modulate a carrier or carriers to form a composite passband signal.

In the foregoing, there has been disclosed apparatus for effectively generating a plurality of waveforms in a single or multi-channel system by the use of a single tapped delay line. The various components therein, namely, the flip-flops, AND gates, delay stages and amplifiers, etc., are conventional and any known apparatus could be utilized in the present invention by one skilled in the art. A twenty-four stage delay line has been utilized but it will be understood by one skilled in the art that more or less stages can be utilized depending upon the frequency range and the characteristics of the desired output signal. Furthermore, the delay line can be implemented by analog delay networks, active or passive, or by digital means such as a shift register. Thus, while the invention has been described with reference to specific embodiments, it will be understood by those skilled in the art that various changes may be made and equivalents may be substituted for elements thereof without departing from the true spirit and scope of the invention. In addition, many modifications may be made to adapt to a particular situation without departing from the essential teachings of the invention.

What is claimed is:

1. A multi-waveform signal generator comprising:

a single tapped delay line for providing a plurality of delay signals, means for supplying a plurality of independent input data streams, and a plurality of circuit means for receiving said plurality of independent input data streams, said plurality of circuit means being responsive to said plurality of delay signals for generating a plurality of independent signal waveforms in a plurality of output channels.

2. The apparatus in claim 1 further including a source of pulses at the transmission rate to be propagated through said delay line, each of said plurality of circuit means comprising a plurality of gate means coupled to said delay line for receiving said data signals in accordance with information to be transmitted, said gate means being sequentially enabled by the pulses propagating through said delay line in the presence of said data signals, a gain adjustment means coupled to each of said gate means to amplify positively or negatively those signals transferred thereby, and amplifier means coupled to said gain adjustment means to sum those signals generated by said gain adjustment means, the output of said amplifier means being a waveform of predetermined phase, frequency and amplitude in direct relation to the applied data signal.

3. The apparatus as set forth in claim 2 further including shift register means coupled to the output of said delay line at predetermined intervals thereof to receive said data signals and selectively enable predetermined ones of said gate means thereby rendering said delay line responsive for more than one transmission interval.

4. In a data communication system, a multi-waveform signal generator for selectively generating a plurality of waveforms in a plurality of channels or a composite waveform in a single channel in response to a plurality of independent sources of timing data information signals, the combination comprising, a source of signal pulses at a transmission rate, a single tapped delay line with a predetermined number of delay stages therein coupled to receive said signal pulses, said pulses being propagated down said delay line at a predetermined multiple of said transmission rate, and at least two signal waveform generation circuit means coupled to said delay line for generating independent output signal waveforms in response to at least two of said independent sources of data information signals.

5. The combination of claim 4 wherein each of said signal waveform generation circuit means comprises:

a plurality of gating means equivalent in number to the submultiple transmission rate coupled to said delay line, said gating means being sequentially enabled by the output of each stage of said delay line in the presence of one of said independent sources of data information signals of at least one transmission interval in duration, a plurality of gain control means coupled to said gating means for amplifying positively or negatively those signals sequentially transferred by said gating means, and summing means coupled to said plurality of gain control means to sum those signals generating by said gain control means to generate an output signal of predetermined phase, frequency and amplitude in direct relation to the input data signals.

6. The combination as set forth in claim 5 further including in each signal waveform generation circuit means a shift register means the stages of which are positioned at predetermined intervals of stages of said delay line in order to divide said delay line into sections the delay time of each of said sections being equivalent to one transmission interval.

7. The combination as set forth in claim 6 further including means for adding the outputs of the respective signal waveform generation means to form a composite multi-waveform signal.

8. The combination as set forth in claim 6 wherein said data information signals are binary in character.

9. The combination as set forth in claim 8 wherein at least one of said signal waveform generation means further includes means for receiving said binary information signals and collectively examining said signals in predetermined groups thereof, means coupled to said receiving and examining means to generate a multi-level signal in relation to the possible combinations of binary digits in said predetermined groups, and wherein each of said gating means includes AND gate circuits responsive to said possible combinations of binary digits, whereby each of said gain control means generates a signal whose relative output amplitude is dependent upon the gain setting thereof but whose amplitude is also stepwise dependent upon the combination of enabled AND gate circuits which interpret the possible combinations of binary digits applied thereto.

10. The combination as set forth in claim 8 including first and second signal waveform generation circuit means, wherein said binary information signals are applied to the first signal waveform generation circuit means, and wherein the complement of said binary information signals are applied to the second signal waveform generation circuit means, and including means for adding the outputs of said first and second signal waveform generation means to form a composite constant average power polar binary signal.

11. The combination as set forth in claim 8 including first and second signal waveform generation circuit means, means for receiving said binary information signals and collectively examining said signals in predetermined groups thereof, means coupled to said receiving and examining means for generating a multi-level signal in relation to the possible combinations of binary digits in said predetermined groups, first AND gates coupled to said generating means for detecting those groups of binary digits with the most significant digit of "1" and enabling said first signal waveform generation circuit means accordingly, and second AND gates coupled to said generating means for detecting those groups of binary digits with the most significant digit of "0" and enabling said second signal waveform generation circuit means accordingly, and means for adding the outputs of said first and second signal waveform generation means to form a composite multi-level polar binary signal.

12. The combination as set forth in claim 8 including a plurality of signal waveform generation circuit means for generating signals at similar frequencies but different phases, means for receiving said binary information signals and collectively examining said signals in predetermined groups thereof, means coupled to said receiving and examining means for generating a multi-level signal in relation to the possible combinations of binary digits in said predetermined groups, an AND gate means coupled to each of said generating means for detecting one of said possible combinations of binary digits and enabling said plurality of signal waveform generation circuits, and means for adding the outputs of said plurality of signal waveform generation circuits to form a multi-phase phase shift keyed signal.

13. The combination as set forth in claim 11 further including a serial to parallel converter coupled to said source of data signals for dividing said input binary data into two parallel binary data streams, wherein said first mentioned receiving and examining means are coupled to the output thereof to receive one of said parallel binary data streams, a third and fourth signal waveform generation circuit means, second means coupled to said serial to parallel converter for receiving the other parallel binary data stream therefrom and collectively examining said signals in predetermined groups thereof, second means coupled to said receiving and examining means for generating a second multi-level signal in relation to the possible combinations of binary digits in said predetermined groups, third AND gates coupled to said second generating means for detecting those groups of binary digits with the most significant digit of "1" and enabling said third signal waveform generation circuit means accordingly, fourth AND gates coupled to said second generating means for detecting those groups of binary digits with the most significant digit of "0" and enabling said fourth signal waveform generation circuit means accordingly, second means for adding the outputs of said third and fourth signal waveform generation means to form a second composite multi-level polar binary signal, and third means for adding the outputs of said first mentioned and second adding means to form a multi-level, multi-channel transmission system whose signals are orthogonal or potentially orthogonal.

14. The apparatus in claim 1 further including:

a source of pulses at a transmission rate to be propagated through said delay line, said independent input data streams being synchronous with said source of pulses.

15. A multi-waveform signal generator comprising:

a single tapped delay line, a plurality of independent input data streams, a plurality of sets of control gates coupled in parallel to the output taps of said delay line for receiving said independent input data streams, the control gates in each set of control gates being sequentially enabled by the outputs from said delay line in the presence of the signals in said data streams, and selective gain control means coupled to each of the control gates in each of the plurality of sets of control gates to provide selective gain adjustment for said data streams to thereby generate a plurality of independent signal waveforms.

16. The apparatus as set forth in claim 15 further including:

a source of pulses at the transmission rate to be propagated through said delay line, said independent input data streams being synchronous with said source of pulses.

17. The apparatus as set forth in claim 16 further including:

an amplifier means coupled to each set of said gain control means to sum those signals generated by said gain control means, the outputs of said amplifier means being waveforms of predetermined phase, frequency and amplitude in direct relation to the applied independent input data streams.

* * * * *